Patented May 5, 1942

2,281,622

UNITED STATES PATENT OFFICE 2,281,622

SATURATED AND UNSATURATED DERIVATIVES OF THE 3-KETO-CYCLOPENTANO-POLYHYDROPHENANTHRENE SERIES

Leopold Ruzicka, Zurich, Switzerland, assignor, by mesne assignments, to Ciba Pharmaceutical Products, Incorporated, Summit, N. J., a corporation of New Jersey No Drawing. Application July 25, 1938, Serial No. 221,228. In Switzerland July 26, 1937

4 Claims. (Cl. 260—397.1)

According to this invention saturated and unsaturated derivatives of the 3-keto-cyclopentano-polyhydrophenanthrene series are made by causing a saturated or unsaturated 3-ketocyclopentanopolyhydrophenanthrene to react with a compound which is suitable for introducing into an α-position to the 3-keto-group the atom grouping

wherein X represents hydrogen, hydroxyl, alkoxy, a substituted or unsubstituted carboxyl group or a hydrocarbon residue and Y represents oxygen or the imino-group.

Suitable parent materials for the invention are compounds which contain a sterol nucleus and contain a keto-group in 3-position. They may be saturated or they may contain a double linkage in α:β-position to the keto-group. The following compounds come particularly into consideration: cholestanone, androstane-diones, dihydro-testosterones, pregnanolones, pregnane-diones, 3-keto-cholanic acid esters and homologues thereof, $\Delta^{1:2}$- and $\Delta^{4:5}$-cholestenones, -androstene-diones, -testosterones, -pregnanol-(20)-ones-(3), and -pregnene-diones (3,20), compounds of the series of the hormone of the suprenal cortex, stigmastadienone, 3-keto-cholenic acid esters and homologues thereof, as well as esters and ethers of the aforesaid hydroxyketones and also other compounds containing the sterol nucleus and having the same structure in ring A.

Compounds suitable for introducing the atom grouping

in which X and Y have the meanings above indicated, are for example formic acid esters, ortho-formic acid esters, acetic acid esters and homologues thereof, oxalic acid esters, malonic acid esters, cinnamic acid esters, benzoic acid esters, furthermore cyanides such as methyl cyanide, ethyl cyanide, propyl cyanide, phenyl cyanide and benzyl cyanide, also carbon dioxide.

In the case of compounds in which the ring A is saturated, condensation occurs at the methylene-group adjoining the 3-keto-group, that is to say in 2- or/and 4-position. Since the two methylene-groups indicated react in succession, it is possible to prepare products which contain different residues in 2- and 4-positions. If there is used for the reaction an α:β-unsaturated 3-keto-compound, the condensation occurs in 2-position in the case of $\Delta^{4:5}$-ketones and in the 4-position in the case of $\Delta^{1:2}$-ketones.

By the reaction of, for example, testosterone with ethyl acetate there is obtained a compound of the following formula

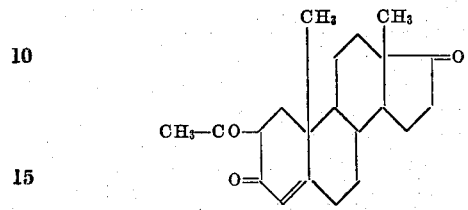

By reaction with a formic acid ester there is obtained the corresponding aldehyde which, if desired, can be converted into the corresponding carboxylic acid by cautious oxidation. The same carboxylic acid can also be made by the direct attachment of carbon dioxide to testosterone. If desired these acids may, for example, be esterified. For the aforesaid oxidation oxidizable groups and nuclear double linkages present are advantageously protected in the manner itself known. If an oxalic acid ester is used for the reaction there is obtained a keto-carboxylic acid ester which can be converted, for example by heating under reduced pressure, into the corresponding carboxylic acid ester according to the following reaction:

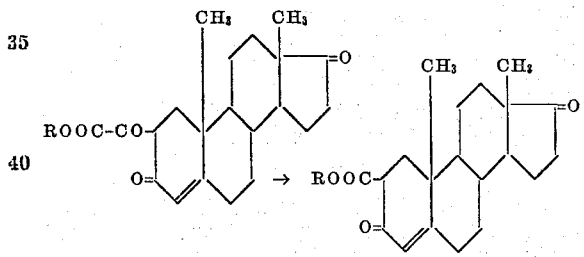

When a cyanide is used instead of ethyl acetate, as above indicated, the imino-groups present in the resulting products may be converted into oxo-groups by saponification.

The reactions above described are conducted in the presence of a suitable condensing agent. As examples there may be named the alkali metals such as sodium, potassium and lithium, especially in the form of their alcoholates, amides and the like. The reaction is advantageously conducted in the presence of a solvent; for this purpose there come into consideration for example benzene, toluene, hexane, ether, petroleum ether and the like. It is frequently advantageous to conduct the reaction at a raised temperature, if required under pressure.

The condensation products resulting from the reaction may be purified by physical methods, such as recrystallisation, distillation, sublimation or adsorption or by making use of their specific reactive groups, for example by way of their salts or their condensation products with reagents for the carbonyl group.

The new products obtainable by the invention may themselves be used for therapeutic purposes or they may serve as intermediate products for the preparation of therapeutic substances.

The following examples illustrate the invention the parts being by weight:

Example 1

To a suspension of 0.7 part of dry sodium ethylate in 50 parts of absolute benzene are added first 1.5 parts of diethyl oxalate, whereby the ethylate dissolves, and then 2.9 parts of testosterone. The whole is heated for one hour on the water bath and is then allowed to stand for 2 days at room temperature. The reaction mixture is then diluted with ether and extracted with ice cold water, and the aqueous solution is at once acidified with acetic acid whilst cooling and extracted several times with ether. The combined ethereal extracts are washed with water, dried over anhydrous sodium sulfate and evaporated. The residue may be purified by recrystallisation from aqueous alcohol or from ethyl acetate or xylene. If required, the product, testosterone-oxalylethyl ester, may be converted into testosterone-2-carboxylic acid ethyl ester by heating under reduced pressure until evolution of carbon monoxide ceases, or it may be converted into the corresponding testosterone-2-aldehyde by treatment with dilute sulfuric acid at a raised temperature.

Example 2

1.2 parts of sodium are dissolved in 50 parts of alcohol which has been freshly distilled over calcium. Into the solution are introduced 20 parts of cholestenone and then 7.5 parts of oxalic ester. After allowing the mixture to stand for 18 hours at room temperature it is diluted with 160 parts of ordinary alcohol and saponified with 40 parts of concentrated aqueous potassium solution while heating. The salt which has formed is sucked off, washed and dissolved in water. The acid is now liberated by acidifying, extracted with ether and dried. There are obtained 17 parts of crude acid which after a single recrystallisation from glacial acetic acid yields 2-oxalylcholestenone of melting point 150-151° C.

Example 3

10 parts of cholestanone are dissolved in 200 parts of ether and 0.6 part of finely dispersed sodium are added to the solution. 4 parts of formic acid amyl are dropped into the mixture while cooling. After standing for about 24 hours all the sodium has decomposed and the mixture is then poured into ice. The ether solution which contains unchanged cholestanone is separated. From the aqueous solution there is obtained the 2-formyl-cholestanone by acidifying with dilute sulfuric acid. After recrystallization from alcohol the product melts at 186° C.

Example 4

1 part of finely powdered sodamide is added to a solution of 2 parts of dihydrotestosterone-acetate in 50 parts of absolute ether and the whole is gently warmed whilst excluding moisture until precipitation of the sodium derivative is complete. Then pure dry carbon dioxide is passed through the suspension for some time also whilst warming. When the reaction is finished, the reaction mixture is cooled, decomposed with ice water and dilute hydrochloric acid and the product is taken up with ether.

From the ethereal solution the acid fraction is extracted by means of cooled sodium carbonate solution, this is separated, acidified and again extracted with ether. After the ethereal extract has been washed and dried as usual the solvent is evaporated whereby there is obtained 3-keto-17-acetoxy-androstane-2-carboxylic acid; if required this may now be esterified.

What I claim is:

1. Saturated and unsaturated derivatives of the 3-keto-cyclopentanopolyhydrophenanthrene series, containing in α-position to the 3-keto-group the atomic grouping

wherein $x$ represents a member of the group consisting of hydrogen, a hydroxyl group, an alkoxy group, a hydrocarbon group, a carboxylic acid group and a group which on hydrolysis will yield a carboxylic acid group.

2. Saturated and unsaturated derivatives of the 3-keto-etio-allocholane series, containing in α-position to the 3-keto-group the atomic grouping

wherein $x$ represents a member of the group consisting of hydrogen, a hydroxyl group, an alkoxy group, a hydrocarbon group, a carboxylic acid group and a group which on hydrolysis will yield a carboxylic acid group.

3. Saturated and unsaturated derivatives of the 3-keto-pregnane series, containing in α-position to the 3-keto-group the atomic grouping

wherein $x$ represents a member of the group consisting of hydrogen, a hydroxyl group, an alkoxy group, a hydrocarbon group, a carboxylic acid group and a group which on hydrolysis will yield a carboxylic acid group.

4. Saturated and unsaturated derivatives of the 3-keto-etio-cholane series, containing in α-position to the 3-keto-group the atomic grouping

wherein $x$ represents a member of the group consisting of hydrogen, a hydroxyl group, an alkoxy group, a hydrocarbon group, a carboxylic acid group and a group which on hydrolysis will yield a carboxylic acid group.

LEOPOLD RUZICKA.